(12) United States Patent
Mercuri

(10) Patent No.: US 10,038,619 B2
(45) Date of Patent: *Jul. 31, 2018

(54) PROVIDING A MONITORING SERVICE IN A CLOUD-BASED COMPUTING ENVIRONMENT

(71) Applicant: Microsoft Technology Licensing, LLC, Redmond, WA (US)

(72) Inventor: Marc Mercuri, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/476,225

(22) Filed: Mar. 31, 2017

(65) Prior Publication Data

US 2017/0207991 A1    Jul. 20, 2017

Related U.S. Application Data

(63) Continuation of application No. 14/458,965, filed on Aug. 13, 2014, now Pat. No. 9,660,884, which is a continuation of application No. 13/764,887, filed on Feb. 12, 2013, now Pat. No. 9,215,154, which is a continuation of application No. 12/900,481, filed on Oct. 8, 2010, now Pat. No. 8,380,845.

(51) Int. Cl.
  *H04L 12/26* (2006.01)
  *G06F 15/16* (2006.01)
  *H04L 29/08* (2006.01)

(52) U.S. Cl.
  CPC .............. *H04L 43/18* (2013.01); *H04L 43/04* (2013.01); *H04L 67/10* (2013.01); *H04L 67/26* (2013.01)

(58) Field of Classification Search
  USPC .................. 709/224, 223, 225, 203, 204
  See application file for complete search history.

(56) References Cited

U.S. PATENT DOCUMENTS

| 6,285,349 | B1 | 9/2001 | Smith |
| 6,618,076 | B1 | 9/2003 | Sukthankar et al. |
| 6,816,907 | B1 | 11/2004 | Mei et al. |
| 6,842,737 | B1 | 1/2005 | Stiles et al. |

(Continued)

FOREIGN PATENT DOCUMENTS

KR    20110056167    5/2011

OTHER PUBLICATIONS

Notice of Allowance dated Sep. 29, 2017 cited in U.S. Appl. No. 14/524,456.

(Continued)

*Primary Examiner* — Jude Jean Gilles
(74) *Attorney, Agent, or Firm* — Workman Nydegger

(57) ABSTRACT

Technologies are described herein for providing a monitoring service in a cloud-based computing environment. A request is received from a user to subscribe to the monitoring service. The monitor workflow may correspond to the monitoring service. A first call to a finder application is executed over a communications network to retrieve data points according to the monitor workflow. A second call to an analyzer application is executed over the communications network to identify a relevant data point in the data points. A third call to a notifier application is executed over the communications network to notify the user of the relevant data point.

21 Claims, 3 Drawing Sheets

(56) References Cited

U.S. PATENT DOCUMENTS

| | | | |
|---|---|---|---|
| 6,950,848 B1 | 9/2005 | Yousefi'zadeh | |
| 7,062,559 B2 | 6/2006 | Yoshimura et al. | |
| 7,162,436 B1 | 1/2007 | Eckel, Jr. | |
| 7,194,522 B1 | 3/2007 | Swildens et al. | |
| 7,269,157 B2 | 9/2007 | Klinker et al. | |
| 7,310,684 B2 | 12/2007 | Patrick et al. | |
| 7,518,623 B2 | 4/2009 | Dowling et al. | |
| 7,552,170 B2 | 6/2009 | Owen et al. | |
| 7,743,001 B1 | 6/2010 | Vermeulen et al. | |
| 7,765,293 B2 | 7/2010 | Adams et al. | |
| 7,783,499 B2 | 8/2010 | Boughannam | |
| 7,801,783 B2 | 9/2010 | Kende et al. | |
| 7,901,095 B2 | 3/2011 | Xiao et al. | |
| 7,986,707 B2 | 7/2011 | Dettori et al. | |
| 8,204,717 B2 | 6/2012 | McLaughlin et al. | |
| 8,234,375 B2 | 7/2012 | Ghadialy et al. | |
| 8,352,473 B2 | 1/2013 | Fuxman et al. | |
| 8,380,845 B2* | 2/2013 | Mercuri | G06F 11/3006 705/300 |
| 8,417,409 B2 | 4/2013 | Bast et al. | |
| 8,564,879 B1 | 10/2013 | Eaton et al. | |
| 8,621,011 B2 | 12/2013 | Bland et al. | |
| 8,843,623 B2 | 9/2014 | Sela | |
| 8,843,632 B2 | 9/2014 | Mercuri | |
| 8,874,787 B2 | 10/2014 | Mercuri | |
| 8,959,219 B2 | 2/2015 | Mercuri | |
| 9,020,831 B2* | 4/2015 | Simske | G06F 17/30893 705/7.27 |
| 9,215,154 B2 | 12/2015 | Mercuri | |
| 2002/0194324 A1 | 12/2002 | Guha | |
| 2003/0045999 A1 | 3/2003 | Joerg et al. | |
| 2003/0061365 A1 | 3/2003 | White et al. | |
| 2003/0115149 A1 | 6/2003 | Dan et al. | |
| 2003/0131073 A1 | 7/2003 | Lucovsky et al. | |
| 2003/0149735 A1 | 8/2003 | Stark et al. | |
| 2004/0064529 A1 | 4/2004 | Meredith et al. | |
| 2004/0213449 A1 | 10/2004 | Safaee-Rad et al. | |
| 2005/0034001 A1 | 2/2005 | Pontarelli | |
| 2005/0038867 A1 | 2/2005 | Henderson et al. | |
| 2005/0068466 A1 | 3/2005 | Waters et al. | |
| 2005/0086330 A1 | 4/2005 | Perham et al. | |
| 2005/0091374 A1 | 4/2005 | Ganesan et al. | |
| 2005/0165656 A1 | 7/2005 | Frederick et al. | |
| 2005/0172027 A1 | 8/2005 | Castellanos et al. | |
| 2005/0241823 A1 | 11/2005 | Beato et al. | |
| 2006/0080120 A1 | 4/2006 | Tcherevik | |
| 2006/0161554 A1 | 7/2006 | Lucovsky et al. | |
| 2006/0224748 A1 | 10/2006 | Gupta et al. | |
| 2006/0265720 A1 | 11/2006 | Cai et al. | |
| 2007/0005777 A1 | 1/2007 | Fremantle et al. | |
| 2007/0156813 A1 | 7/2007 | Galvez et al. | |
| 2007/0156919 A1 | 7/2007 | Potti et al. | |
| 2007/0256083 A1 | 11/2007 | Vayssiere | |
| 2007/0291121 A1 | 12/2007 | Chuang et al. | |
| 2008/0027772 A1 | 1/2008 | Gernega et al. | |
| 2008/0062194 A1 | 3/2008 | Bassi et al. | |
| 2008/0080393 A1 | 4/2008 | Meijer et al. | |
| 2008/0080396 A1 | 4/2008 | Meijer et al. | |
| 2008/0080552 A1 | 4/2008 | Gates et al. | |
| 2008/0082693 A1 | 4/2008 | Meijer et al. | |
| 2008/0104393 A1 | 5/2008 | Glasser et al. | |
| 2008/0134043 A1 | 6/2008 | Georgis et al. | |
| 2008/0147453 A1* | 6/2008 | Kogan | G06Q 10/06 705/7.15 |
| 2008/0189243 A1 | 8/2008 | Li et al. | |
| 2008/0235384 A1 | 9/2008 | Meek et al. | |
| 2008/0301219 A1 | 12/2008 | Thornburgh et al. | |
| 2008/0320497 A1 | 12/2008 | Tarkoma et al. | |
| 2009/0006614 A1 | 1/2009 | Le et al. | |
| 2009/0037896 A1 | 2/2009 | Grechanik et al. | |
| 2009/0048994 A1 | 2/2009 | Applebaum et al. | |
| 2009/0089078 A1 | 4/2009 | Bursey | |
| 2009/0150565 A1 | 6/2009 | Grossner et al. | |
| 2009/0157419 A1 | 6/2009 | Bursey | |
| 2009/0182955 A1 | 7/2009 | Cherukuri | |
| 2009/0196308 A1 | 8/2009 | Pan et al. | |
| 2009/0210528 A1 | 8/2009 | Swildens et al. | |
| 2009/0248693 A1 | 10/2009 | Sagar et al. | |
| 2010/0030866 A1 | 2/2010 | Bedi | |
| 2010/0076856 A1 | 3/2010 | Mullins | |
| 2010/0088150 A1 | 4/2010 | Mazhar et al. | |
| 2010/0131324 A1 | 5/2010 | Ferris | |
| 2010/0131649 A1 | 5/2010 | Ferris | |
| 2010/0153482 A1 | 6/2010 | Kim et al. | |
| 2010/0211782 A1 | 8/2010 | Auradkar et al. | |
| 2010/0231603 A1 | 9/2010 | Kang | |
| 2010/0299763 A1* | 11/2010 | Marcus | G06Q 10/06 726/30 |
| 2011/0022812 A1 | 1/2011 | van der Linden et al. | |
| 2011/0032248 A1 | 2/2011 | Atkins | |
| 2011/0047230 A1* | 2/2011 | McGee | H04L 41/0609 709/206 |
| 2011/0093435 A1 | 4/2011 | Zha et al. | |
| 2011/0093436 A1 | 4/2011 | Zha et al. | |
| 2011/0109228 A1 | 5/2011 | Shimomura et al. | |
| 2011/0227964 A1 | 9/2011 | Chanji et al. | |
| 2011/0231899 A1 | 9/2011 | Pulier et al. | |
| 2011/0238458 A1* | 9/2011 | Purcell | G06F 9/5072 705/7.27 |
| 2011/0238459 A1 | 9/2011 | Bottom | |
| 2011/0267365 A1 | 11/2011 | Kostal et al. | |
| 2011/0276490 A1 | 11/2011 | Wang et al. | |
| 2011/0296022 A1 | 12/2011 | Ferris et al. | |
| 2012/0023501 A1 | 1/2012 | Chi et al. | |
| 2012/0066487 A1 | 3/2012 | Brown et al. | |
| 2012/0079490 A1 | 3/2012 | Bond et al. | |
| 2012/0124193 A1 | 5/2012 | Ebrahim et al. | |
| 2012/0300044 A1 | 11/2012 | Thomas et al. | |
| 2013/0016082 A1 | 1/2013 | Coley et al. | |
| 2013/0041866 A1 | 2/2013 | Simske et al. | |
| 2013/0147764 A1 | 6/2013 | Chaji et al. | |
| 2014/0359121 A1 | 12/2014 | Mercuri | |
| 2015/0081914 A1 | 3/2015 | Mercuri | |
| 2015/0113167 A1 | 4/2015 | Mercuri | |
| 2015/0222525 A1 | 8/2015 | Mercuri | |

OTHER PUBLICATIONS

Notice of Allowance dated Aug. 11, 2015 cited in U.S. Appl. No. 13/764,887.
Notice of Allowance dated Sep. 11, 2015 cited in U.S. Appl. No. 13/764,887.
Notice of Allowance dated Sep. 15, 2016 cited in U.S. Appl. No. 14/458,965.
Notice of Allowance dated Dec. 27, 2016 cited in U.S. Appl. No. 14/458,965.
Office Action dated Apr. 24, 2017 cited in U.S. Appl. No. 14/619,718.
Notice of Allowance dated Jul. 11, 2017 cited in U.S. Appl. No. 14/619,718.
Office Action dated Aug. 7, 2017 cited in U.S. Appl. No. 14/524,456.
"Amazon Elastic Compute Cloud (Amazon EC2)", Retrieved Jul. 25, 2010 from <<http://aws.amazon.com/ec2/>>, 13 Paqes.
Beal, Sheila "Use Google Transit to Help You Navigate Oahu's Bus System," Published on: Mar. 11, 2009, Available at: http://www.govisithawaii.com/2007/09/13/use-google-maps-to-help-you navigate-oahus-bus-system/, 3 pages.
"Best Ever Cloud-based Monitoring Service Unveiled", May 31, 2010, Retrieved from<<http://news.znetindia.com/best-ever-cloud-based-monitoring-service-unveiled.html>>, 4 pgs.
Braynard, et al., "Opus: An Overlay Peer Utility Service", Retrieved at <<http://citeseerx.ist.psu.edu/viewdoc/download?doi=10.1.1.19.728&rep=rep1&type=pdf>>, IEEE Proceedings Open Architectures and Network Programming, 2002, pp. 12.
Buyya, et al., "Market-Oriented Cloud Computing: Vision, Hype, and Reality for Delivering IT Services as Computing Utilities", Retrieved <<http://arxiv.org/ftp/arxiv/papers/0808/0808.3558.pdf>>, Proceedings of the 10th IEEE International Converence on High Performance Computing and Communications, HPPC, Sep. 25-27, 2008, pp. 9.

(56) References Cited

OTHER PUBLICATIONS

Buyya, et al., "Service and Utility Oriented Distributed Computing Systems: Challenges and Opportunities for Modeling and Simulation Communities", Retrieved at<< http://ieeexplore.ieee.org/stamp/stamp.jsp? arnumber=04494407>>, Proceedings of the 41th Annual Simulation Symposium, ANSS-41, Apr. 14-16, 2008, pp. 68-81.

Chandra, et al., "Dynamic Resource Allocation for Shared Data Centers Using Online Mesurements", Retrieved at <<http://www.cs.uwaterloo.ca/~brecht/servers/readings-new/chandra-iwqos-2003.pdf>>, Technical Report, TR02-30, Department of Computer Science, 2002, pp. 1-22.

Chatterjee, "Messaging Patterns in Service-Oriented Architecture," Apr. 2004, Retrieved from <<http://msdn.microsoft.com/en-us/library/aa480027.aspx#aj2mpsoarch_topic6>>, Microsoft Architect Journal, 17 pgs.

Chitu, Alex "Public Transit Directions in Google Maps," blog, Published on: Oct. 7, 2007, Available at: http://googlesystem.blogspot.in/2007/10/public-transit-directions-in-google.html, 3 pages.

Clayman, et al., "Monitoring Service Clouds in the Future Internet", 2010, Towards the Future Internet. G. Tselentis et al. (Eds.), IOS Press, p. 115-126.

"Cloud Services: Deploy websites, servers and storage on-demand. Only pay for what you need", Retrieved Jul. 25, 2010 from http://tier3.com/cloud-services, 1 pq.

Fankhauser, et al., "Service Level Agreement Trading for the Differentiated Services Architecture", Retrieved at <<http://citeseerx.ist.psu.edu/viewdoc/download?doi=10.1.1.37.5583&rep=rep1&type=pdf>>, Swiss Federal Institute of Technology, Computer Engineering and Networks Lab, Technical Report, No. 59, Nov. 1999, pp. 1-17.

Franceschini, et al., "Cloud Computing: An Agile Approach to IT", Retrieved Aug. 3, 2010 from <<http://www.hds.com/assets/pdf/cloud-computing-an-agile-approach-to-it.pdf>>, 20 pgs.

Garg, Avichal, "Public Transit via Google," Published on: Dec. 7, 2005, Available at: http://googleblog.blogspot.com/2005/12/public-transit-via-google.html, 4 pages.

Guiding Tech homepage, Published on: Apr. 23, 2015, Available at: http://www.guidingtech.com, 8 pages.

Hassidim, "Cloud Tools Command Line Framework", Retrieved Aug. 20, 2010 from <<http://www.gigaspaces.com/wiki/display/CCF/Cloud+Tools+Command+Line+Framework>>, 7 pqs.

Leung, "Cloud Monitoring Services: A Resource Guide," Feb. 4, 2010, Retrieved at <<http://www.datacenterknowledge.com/archives/2010/02/04/cloud-monitoring-services-aresource-quide/>>, oas.

Loh, "Automating Cloud Services", Nov. 12, 2009, Retrieved from <<http://www.tapinsystems.com/downloads/Automatina_Cloud_Services.pdf>>, 14 pgs.

Marko, "Cloud Applications: What's Ready?—Cloud Computing Tiers", Feb. 26, 2010, Processor, vol. 32 No. 5, 4 pqs.

"Microsoft Windows Azure Cloud Computing Service", Retrieved Aug. 20, 2010 from <<http://www.itstrategists.com/Microsoft-Azure.aspx>>, 1 page.

Mitra, "Architecture in practice, Part 5: SOA Scenario 2: Service connectivity options," Dec. 18, 2007, Retrieved from <<http://www.ibm.com/developerworks/webservices/library/ar-arprac5/index.html>>, 13 pgs.

Office Action for U.S. Appl. No. 14/524,456, dated Jan. 27, 2017, Mercuri et al., "Optimized Consumption of Third-Party Web Services in a Composite Service", 11 pages.

Office Action for U.S. Appl. No. 12/906,144, dated Oct. 14, 2014, Mercuri, "Dynamic Rerouting of Service Requests Between Service Endpoints for Web Services in a Composite Service".

"webMethods X," Dec. 2007, Retrieved from <<http://www.softwareag.com/fr/images/SAG_XBroker_FS_Dec07-web_tcm46-33852.pdf>>, 2 pqs.

Office Action for U.S. Appl. No. 12/900,481, dated Oct. 15, 2012, Mercuri, "Providing a Monitoring Service in a Cloud-Based Computing Environment".

Office Action for U.S. Appl. No. 14/491,059, dated Oct. 8, 2015, Marc Mercuri, "Allocation of Resources Between Web Services in a Composite Service", 17 pages.

Office Action for U.S. Appl. No. 12/907,996, dated Nov. 14, 2012, Mercuri, "Dynamic Rerouting of Service Requests Between Service Endpoints for Web Services in a Composite Service".

Office Action for U.S. Appl. No. 12/901,591, dated Nov. 21, 2012, Mercuri, "Allocation of Resources Between Web Services in a Composite Service".

Office Action for U.S. Appl. No. 13/764,887, dated Nov. 7, 2013, Mercuri, "Providing a Monitoring Service in a Cloud-Based Computing Environment".

Office action for U.S. Appl. No. 14/619,718, dated Dec. 2, 2016, Mercuri, "Dynamic Rerouting of Service Requests between Service Endpoints for Web Services in a Composite Service", 22 pages.

Office Action for U.S. Appl. No. 12/906,144, dated Dec. 4, 2013, Mercuri, "Dynamic Rerouting of Service Requests Between Service Endpoints for Web Services in a Composite Service".

Office action for U.S. Appl. No. 14/619,718, dated Feb. 18, 2016, Mercuri, "Dynamic Rerouting of Service Requests between Service Endpoints for Web Services in a Composite Service", 20 pages.

Office action for U.S. Appl. No. 14/458,965 dated Feb. 3, 2016, Mercuri, "Providing a monitoring service in a cloud-based computing environment", 5 pages.

Office action for U.S. Appl. No. 14/491,059, dated Mar. 16, 2015, Mercuri, "Allocation of Resources Between Web Services in a Composite Service", 6 pages.

Office action for U.S. Appl. No. 14/491,059, dated Mar. 25, 2016, Mercuri, "Allocation of Resources Between Web Services in a Composite Service", 14 pages.

Office Action for U.S. Appl. No. 12/907,996, dated Apr. 2, 2013, Mercuri, "Communication and Coordination Between Web Services in a Cloud-Based Computing Environment".

Office Action for U.S. Appl. No. 12/907,998, dated May 1, 2013, Mercuri, "Optimized Consumption of Third-Party Web Services in a Composite Service".

Office Action for U.S. Appl. No. 13/764,887, dated May 2, 2014, Mercuri, "Providing a Monitoring Service in a Cloud-Based Computing Environment".

Office Action for U.S. Appl. No. 12/901,591, dated May 21, 2014, Mercuri, "Allocation of Resources Between Web Services in a Composite Service".

Office Action for U.S. Appl. No. 12/901,591, dated May 6, 2013, Mercuri, "Allocation of Resources Between Web Services in a Composite Service".

Office Action for U.S. Appl. No. 12/907,998, dated Jun. 26, 2014, Mercuri, "Optimized Consumption of Third Party Web Services in a Composite Service".

Office Action for U.S. Appl. No. 12/906,144, dated Jul. 23, 2013, Mercuri, "Dynamic Rerouting of Service Requests Between Service Endpoints for Web Services in a Composite Service".

Office action for U.S. Appl. No. 14/619,718, dated Jul. 6, 2016, Mercuri, "Dynamic Rerouting of Service Requests between Service Endpoints for Web Services in a Composite Service", 22 pages.

Office action for U.S. Appl. No. 14/458,965 dated Aug. 21, 2015, Mercuri, "Providing a monitoring service in a cloud-based computing environment", 5 pages.

Parameswaran et al., "Cloud Interoperability and Standardization", 2009, SETLabs Briefings, vol. 7, No. 7, pp. 19-27.

Partho, "Top10 Cloud Computing Service Providers in 2010: #8.Go Grid", May 21, 2010, Retrieved from <<http://blog.taragana.com/index. php/archive/top-10-cloud-computingservice-providers-in-2010/>>, 8 pgs.

"SOA Software: Frequently Asked Questions," Retrieved Jul. 26, 2010 from <<http://www.soa.com/solutions/faqs/>>, 7 Pages.

Taft, "CSC to Resell Microsoft Cloud Services", Jul. 5, 2009, Retrieved from << http://www.devsource.com/c/a/Architecture/CSC-to-Resell-Microsoft-Cloud-Services/>>, 2 pqs.

"Windows Azure platform", Retrieved Jul. 25, 2010 from <<http://www.microsoft.com/windowsazure/>>, 2 pgs.

(56) References Cited

OTHER PUBLICATIONS

Newman, et al., "MonALISA : A Distibuted Monitoring Service Architecture", In Proceedings of Conference on Computing in High Energy and Nuclear Physics, Mar. 24, 2003, pp. 1-8.
Notice of Allowance dated Oct. 11, 2017 cited in U.S. Appl. No. 14/619,718.

* cited by examiner

PROVIDING A MONITORING SERVICE IN A CLOUD-BASED COMPUTING ENVIRONMENT

CROSS REFERENCE TO RELATED APPLICATIONS

This application is a continuation of co-pending U.S. application Ser. No. 14/458,965, filed Aug. 13, 2014 entitled "Providing a Monitoring Service in a Cloud-Based Computing Environment," which is a continuation of U.S. application Ser. No. 13/764,887 filed Feb. 12, 2013 entitled "Providing a Monitoring Service in a Cloud-Based Computing Environment," which is a continuation of U.S. application Ser. No. 12/900,481 filed Oct. 8, 2010 entitled "Providing a Monitoring Service in a Cloud-Based Computing Environment," which are all expressly incorporated herein by reference in their entirety.

BACKGROUND

Conventional software applications have generally been installed and executed in a localized computing environment, such as a desktop or enterprise environment. The advancement of increasingly powerful computing devices and expanding data storage capacity in large scale networked data centers has moved consumer and business-oriented applications away from local computing environments to computing environments provided over the Internet or other types of networks, commonly referred to as "cloud-based" computing environments. These applications may be offered as hosted services in the cloud-based computing environment.

As the Internet continues to grow, service providers may continue to offer more diverse hosted services. These hosted services may be offered at various levels, including end user services and various backend services. Combining these hosted services can yield a composite service, such as a monitoring service. It is difficult, however, to integrate multiple levels of hosted services, especially when these hosted services are offered by different service providers.

It is with respect to these considerations and others that the disclosure made herein is presented.

SUMMARY

Technologies are described herein for providing a monitoring service in a cloud-based computing environment. A monitoring service may refer to a service that monitors the availability of relevant data, as defined by a user, over a period of time and retrieves the relevant data when it becomes available. The monitoring service may then notify the user of the relevant data via a notification method also defined by the user. Some examples of monitoring services may include a package tracking assistant adapted to proactively monitor the location of a package and notify a recipient of the upcoming arrival of the package, a product finder adapted to notify a user when a product is available for purchase and satisfies other criteria (e.g., a certain price, certain types of merchants, certain payment systems, etc.), and a travel assistant adapted to notify the user of any service disruptions in a given flight.

Through the utilization of the technologies and concepts presented herein, a framework for providing a monitoring service may include a façade, a controller application, a monitor application, a finder application, an analyzer application, and a notifier application. The controller application, the monitor application, the finder application, the analyzer application, and the notifier application may each be World Wide Web ("web") services offered and exposed by different entities in the cloud-based environment.

Example technologies may provide a monitoring service in a cloud-based computing environment. The technologies may receive a request from a user to subscribe to a monitoring service. The technologies may receive a monitor workflow corresponding to the monitoring service. The technologies may execute a first call to a finder application over a communications network to retrieve data points according to the monitor workflow. The technologies may execute a second call to an analyzer application over the communications network to identify a relevant data point in the data points. The technologies may execute a third call to a notifier application over the communications network to notify the user of the relevant data point.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
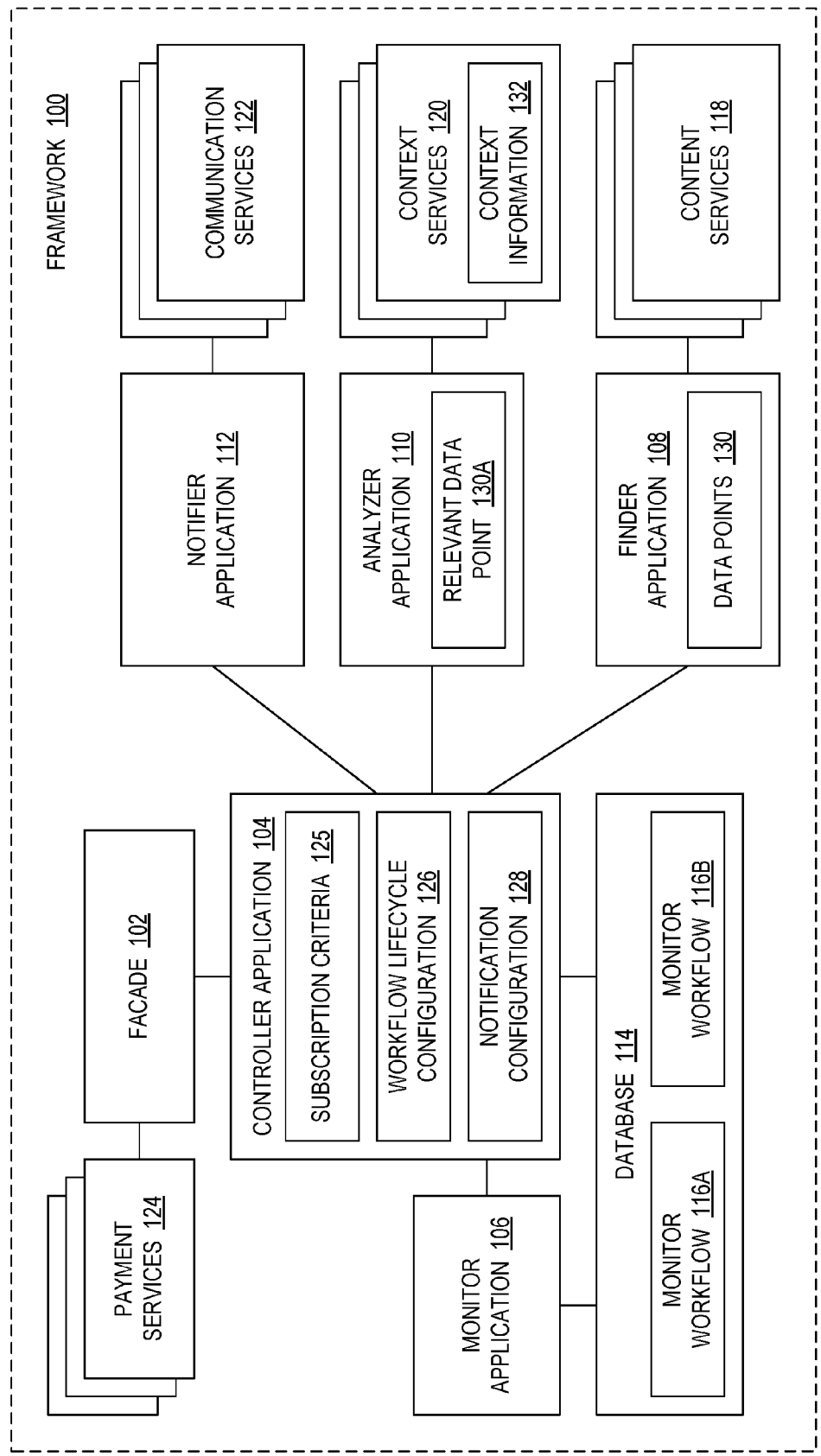
FIG. 1 is a block diagram illustrating a framework adapted to provide a monitoring service in a cloud-based computing environment, in accordance with some embodiments.

The following detailed description is directed to technologies for providing a monitoring service in a cloud-based computing environment. In accordance with some embodiments described herein, a framework adapted to implement monitoring services in a cloud-based computing environment is provided. The framework may provide a standardized architecture with which service providers can design web services utilized to implement monitoring services. Users may subscribe to one or more monitoring services. The monitoring services may then remotely provide notifications of relevant data related to the monitoring services to the users via suitable computing devices and notification technologies.

Some examples of monitoring services that can be implemented through the framework may include a package tracking assistant, a product finder, and a travel assistant. Other monitoring services may be similarly implemented through the framework described herein. The package tracking assistant may be adapted to proactively provide information related to status of a package. For example, a package recipient may submit one or more package tracking numbers to the package tracking assistant. The package tracking assistant may then monitor the progress of corresponding packages in transit. At a predefined time (e.g., a day) prior to the package arriving at its destination, the package tracking assistant may alert the package recipient of the upcoming arrival of the package. The package recipient can utilize this information to make arrangements to receive the package, thereby resulting in an improved customer experience for the package recipient.

The product finder may be adapted to provide product purchase information according to purchase criteria submitted by a user. The purchase criteria may include an item identifier (e.g., name, keyword, universal product code, etc.), item price, item availability, a preference for an online store or a brick-and-mortar store, a preference for a set price or an auction system, and/or the like. For example, the user may submit to the product finder purchase criteria specifying a desire to purchase a popular video game system at only local stores at a price less than a predefined price. The product finder may then continuously monitor the local stores until the video game system becomes available at the desired price or until the user cancels the subscription to the product finder.

The travel assistant may be adapted to provide relevant travel related information according to travel criteria submitted by a user. The travel assistant may be considered as a superset of the product finder. Examples of relevant travel related information may include service disruptions in a given flight. The travel assistant may monitor the flight for changes in status, such as cancellations, delays, etc. The travel assistant may also monitor the status of the flight while the flight is in the air. If the travel assistant determines that the user may miss a connecting flight due to the delay, the travel assistant may automatically query backend data services to find a new connecting flight or to book a local hotel. In addition to providing notifications of service disruptions, the travel assistant may automatically transmit various flight related information, such as itinerary details and a weather forecast of the destination city, to the user's mobile device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing a monitoring service in a cloud-based computing environment will be described. FIG. 1 illustrates a framework 100 adapted to provide monitoring services in a cloud-based computing environment, in accordance with some embodiments. The framework 100 may include a façade 102, a controller application 104, a monitor application 106, a finder application 108, an analyzer application 110, a notifier application 112, and a database 114. The database 114 may store one or more monitor workflows, including monitor workflow 116A and monitor workflow 116B (collectively referred to as monitor workflows 116). The finder application 108 may communicate with one or more content services 118. The analyzer application 110 may communicate with one or more context services 120. The notifier application 12 may communicate with one or more communication services 122. The façade 102 may communicate with one or more payment services 124.

Figure 3:
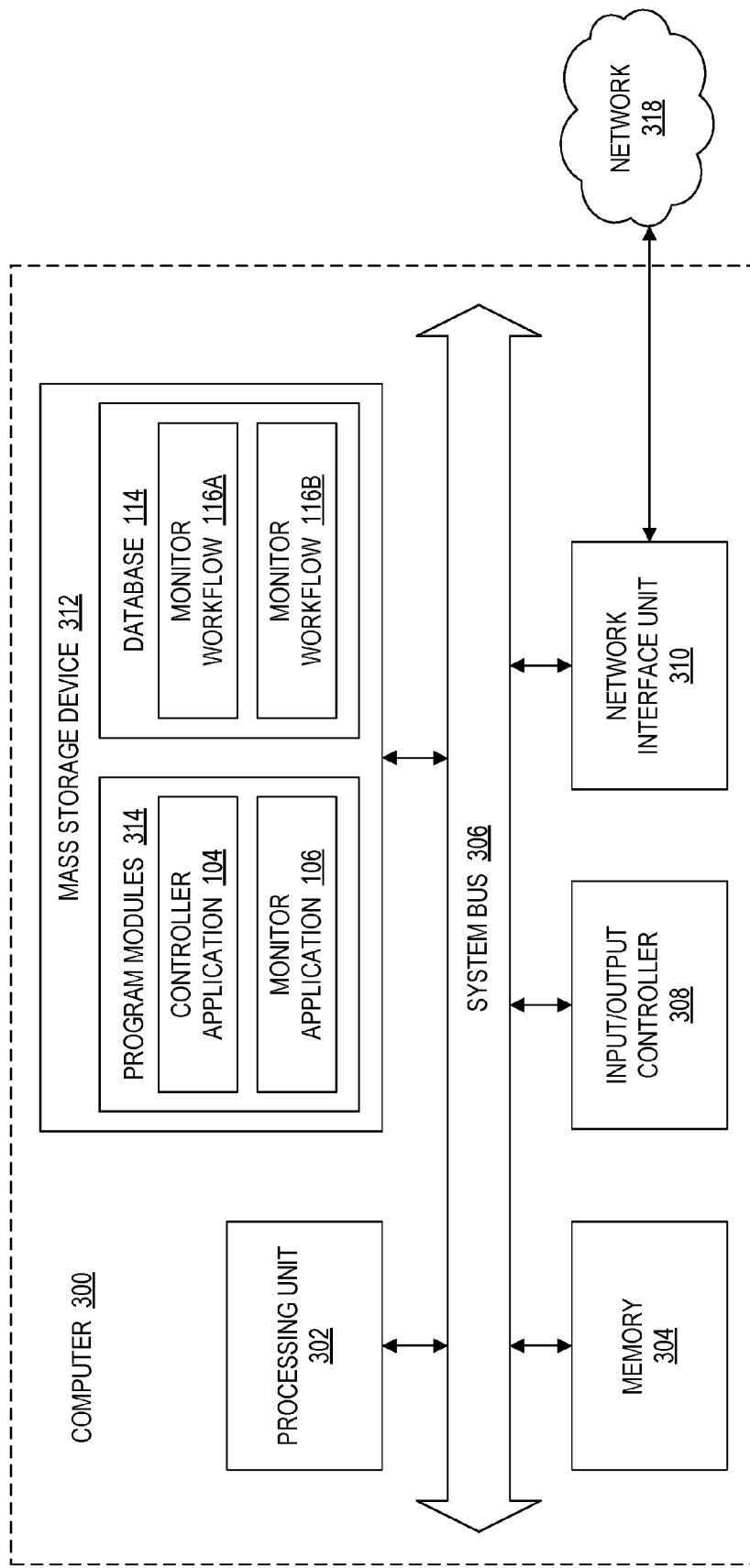
FIG. 3 is a computer architecture diagram showing an illustrative computer hardware architecture for a computing system capable of implementing the embodiments presented herein.

The controller application 104, the monitor application 106, the finder application 108, the analyzer application 110, the notifier application 112, the content services 118, the context services 120, the communication services 122, and the payment services 124 may be executed on one or more computing devices (not shown) operatively coupled via a network, such as the network 318 in FIG. 3. The controller application 104, the monitor application 106, the finder application 108, the analyzer application 110, the notifier application 112, the content services 118, the context services 120, the communication services 122, and the payment services 124 may be web services offered and exposed by one or more different entities in the cloud-based environment. It should be appreciated that the controller application 104, the monitor application 106, the finder application 108, the analyzer application 110, the notifier application 112, the content services 118, the context services 120, the communication services 122, and/or the payment services 124 may be embodied in one or more applications. For example, in some embodiments, the controller application 104 may be configured to additionally perform the functionality of the monitor application 106, thereby eliminating the monitor application 106.

The combination of the controller application 104, the monitor application 106, the finder application 108, the analyzer application 110, the notifier application 112, the content services 118, the context services 120, the communication services 122, and the payment services 124 operating in conjunction with each other may provide the monitoring service. The framework 100 provides a standardized approach for providing various components of the framework 100. For example, one service provider may offer the controller application 104 while another service provider may offer the finder application 108. The framework 100 enables the two service providers generate and operate their respective applications independently for the end result of providing the monitoring service.

According to various embodiments, the façade 102 is a software component that serves as an external interface to the controller application 104. The controller application 104 may maintain globally unique identifiers ("GUIDs") associated with each instance of the monitor workflows 116 in the database 114. In this way, external users or applications can access, through the controller application 104, the monitor workflows 116 without having to store a cookie or otherwise maintaining the GUIDs. As used herein, a "monitor workflow" may refer to a sequence of operations, including business logic and steps to process business logic, performed by the controller application 104 to perform a monitoring service as defined by the subscription criteria, which are described below. The façade 102 may also provide an aggregate interface across multiple controller applications adapted to access different monitor workflows.

The façade 102 may also provide functionality for subscribing to a monitoring service. In some embodiments, the façade 102 may be a website adapted to communicate with the controller application 104. The website may provide a user interface where users can subscribe to enter subscription criteria 125 specifying relevant parameters related to or required by the monitoring service. The website may also charge a fee to subscribe to the monitoring service. The fee may be processed by the payment services 124. Some examples of the payment services 124 may include credit card processing services, check verification services, credit reporting services, and electronic payment systems. In some other embodiments, the façade 102 may be a web service that can be consumed by other applications. For example, the façade 102 may be a commercial service sold to website providers that desire to add to their websites functionality enabling their users to subscribe to particular monitoring services.

The façade 102 may also provide functionality for defining a workflow lifecycle configuration 126, accessing workflow status, and defining a notification configuration 128. Regarding the workflow lifecycle configuration 126, the façade 102 may provide operations for specifying a time limit of the user's subscription to the monitoring service. Regarding the workflow status, the façade 102 may provide operations for retrieving the current state of the monitor workflow (e.g., in progress, completed, etc.). For example, access to the workflow status may be provided via a "GetStatus" command or other similar command. Regarding the notification configuration 128, the façade 102 may provide operations for retrieving available notification methods, as well as subscribing and unsubscribing and/or selecting preferred notification methods. Some example notification methods may include electronic mail ("email"), voice calls, text messages through Short Message Service ("SMS"), instant messages, and news feeds through Really Simple Syndication ("RSS").

In an example, the monitoring service subscribed through the façade 102 may be a video game finder service, and the subscription criteria 125 may be the name of the video game and a maximum price of the video game. In another example, the monitoring service subscribed through the façade 102 may be a travel assistant service, and the subscription criteria 125 may be the name of the airline, the flight number, and the departure date. The user may also define the workflow lifecycle configuration 126 (e.g., set a time frame of one month to purchase the video game) and the notification configuration 128 (e.g., set a preference for SMS text messages) through the façade 102.

Upon receiving the subscription criteria 125, the workflow lifecycle configuration 126, and the notification configuration 128 from the user, the façade 102 may communicate the subscription criteria 125, the workflow lifecycle configuration 126, and the notification configuration 128 to the controller application 104. The controller application 104 may then determine whether a monitor workflow, such as the monitor workflows 116, exists that corresponds to the subscription criteria 125. Each unique collection of subscription criteria may correspond to a different monitor workflow.

If an existing monitor workflow, such as the monitor workflow 116A, corresponding to the subscription criteria 125 is available, then the controller application 104 may retrieve the monitor workflow 116A from the database 114 by the GUID corresponding to the monitor workflow 116A. If an existing monitor workflow corresponding to the subscription criteria 125 is not available, then the controller application 104 may instruct the monitor application 106 to generate a new monitor workflow, such as the monitor workflow 116B, corresponding to the subscription criteria 125. The monitor application 106 may then generate the monitor workflow 116B and store the monitor workflow 116B in the database 114. The monitor application 106 may also return the GUID corresponding to the monitor workflow 116B to the controller application 104 in response to the instruction. Upon receiving the GUID corresponding to the monitor workflow 116B from the monitor application 106, the controller application 104 may retrieve the monitor workflow 116B. Upon retrieving the monitor workflow 116A, 116B from the database 114, the controller application 104 may execute the monitor workflow 116A, 116B.

Each monitor workflow, such as the monitor workflow 116A, may include a first call to the finder application 108, a second call to the analyzer application 110, and a third call to the notifier application 112. For example, the monitor workflow 116A may define web addresses to the finder application 108, the analyzer application 110, and the notifier application 112. By executing the monitor workflow 116A, the controller application 104 may execute the first call to the finder application 108, the second call to the analyzer application 110, and the third call to the notifier application 112.

When the controller application 104 makes the first call to the finder application 108 according to the monitor workflow 116A, the controller application 104 may provide the subscription criteria 125 to the finder application 108. The finder application 108 may be configured to query and retrieve data points 130 from the content services 118 on a predefined schedule or in predefined time intervals. As used herein, "data points" may refer to content retrieved by the finder application 108 from the content services 118. The data points 130 may correspond to the subscription criteria 125 entered by the user through the façade 102. As such, the content services 118 may depend on the data points 130 as configured by the finder application 108. That is, the finder application 108 may utilize different content services in order to retrieve different types of data points. When the finder application 108 retrieves the data points 130 from the content services 118, the finder application 108 may return the data points 130 to the monitor workflow 116A in response to the first call. In some embodiments, the finder application 108 may aggregate data points retrieve from multiple content services 118 and/or provide the aggregated data points to the monitor workflow 116A in RSS format.

In an example, if the subscription criteria 125 include a name of a video game and a maximum price of the video, then some of the data points may include video game selection, video game availability, and video game pricing. In this example, the content services 118 may include online stores, websites of brick-and-mortar stores, and online auction websites where video game selection, video game availability, and video game pricing can be retrieved. In another example, if the subscription criteria 125 include the name of an airline, a flight number, and a departure date, then some of the data points may include flight delays, flight cancellations, and weather forecast information for the arrival city. In this example, the content services 118 may include airport websites for the departure city and the arrival city, the airline website, and weather reporting websites where flight delays, flight cancellations, and weather forecast information can be retrieved.

When the controller application 104 makes the second call to the analyzer application 110 according to the monitor workflow 116A, the controller application 104 may provide the data points 130 to the analyzer application 110. The analyzer application 110 may be configured to retrieve context information 132 from one or more context services 120. The context information 132 may be utilized to provide contextual insight to the data points 130. In particular, the controller application 104 may apply the context information 132 to the data points 130 in order to identify at least one relevant data point 130A. Some examples of the context information 132 may include reputation, schedule, location, user profiles, and popularity. Upon identifying the relevant data point 130A in the data points 130, the analyzer application 110 may return the relevant data point 130A to the controller application 104 in response to the second call.

In an example, the monitoring service subscribed through the façade 102 may be a delivery scheduling service, and the subscription criteria 125 may include a business address of the recipient. The context services 120 may include an enterprise server configured to handle electronic mailing, calendaring, contacts, and tasks. The analyzer application 110 may retrieve, as the context information 132, availability status information regarding the recipient (e.g., available, busy, out of office, in a meeting, etc.) from the recipient's calendar. The data points 130 may include multiple delivery times in a time frame when the recipient is at work. In this example, the analyzer application 110 may eliminate any delivery times where the recipient is not available according to the context information. As a result, the relevant data point 130A may include a delivery time where the recipient is available to accept deliveries In another example, the monitoring service subscribed through the façade 102 may be a product finder service, and the subscription criteria may include a product name. The context services 120 may include merchant websites and consumer review websites. The analyzer application 110 may retrieve, as the context information 132, reviews of the product and reviews of merchants selling the product from the merchant websites and the consumer review websites. The data points 130 may include location and contact information regarding multiple stores having the product in stock. In this example, the analyzer application 110 may eliminate any stores that have poor reviews below a certain threshold according to the context information. As a result, the relevant data point 130A may include location and contact information regarding a store having positive reviews.

When the controller application 104 makes the third call to the notifier application 112 according to the monitor workflow 116A, the controller application 104 may provide the relevant data point 130A and the notification configuration 128 to the notifier application 112. The notifier application 112 may then communicate the relevant data point 130A to remote users via an appropriate communication service in the communication services 122. The appropriate communication service may be adapted to deliver notification of the relevant data point to the user by the notification method defined in the notification configuration 128. Some examples of communication services 122 may include services adapted to provide email, voice, text messages, instant messaging, and news feeds. Some services may provide for multiple notification methods, while other services may be more specialized, providing for only one notification method.

Although FIG. 1 illustrates only one controller application 104, one monitor application 106, one finder application 108, one analyzer application 110, and one notifier application 112, it should be appreciated that multiple monitor applications, multiple finder applications, multiple analyzer applications, and multiple notifier applications may be implemented. In such implementations, applications may call similar applications and aggregate the results. For example, an illustrative framework may include a first finder application and a second finder application. The first finder application may retrieve a first set of data points and further execute a call to the second finder application. The second finder application may retrieve a second set of data points and return the second set of data points to the first finder application. The first finder application may aggregate the first set of data points and the second set of data points and return the aggregated data points to the controller application 104.

Figure 2:
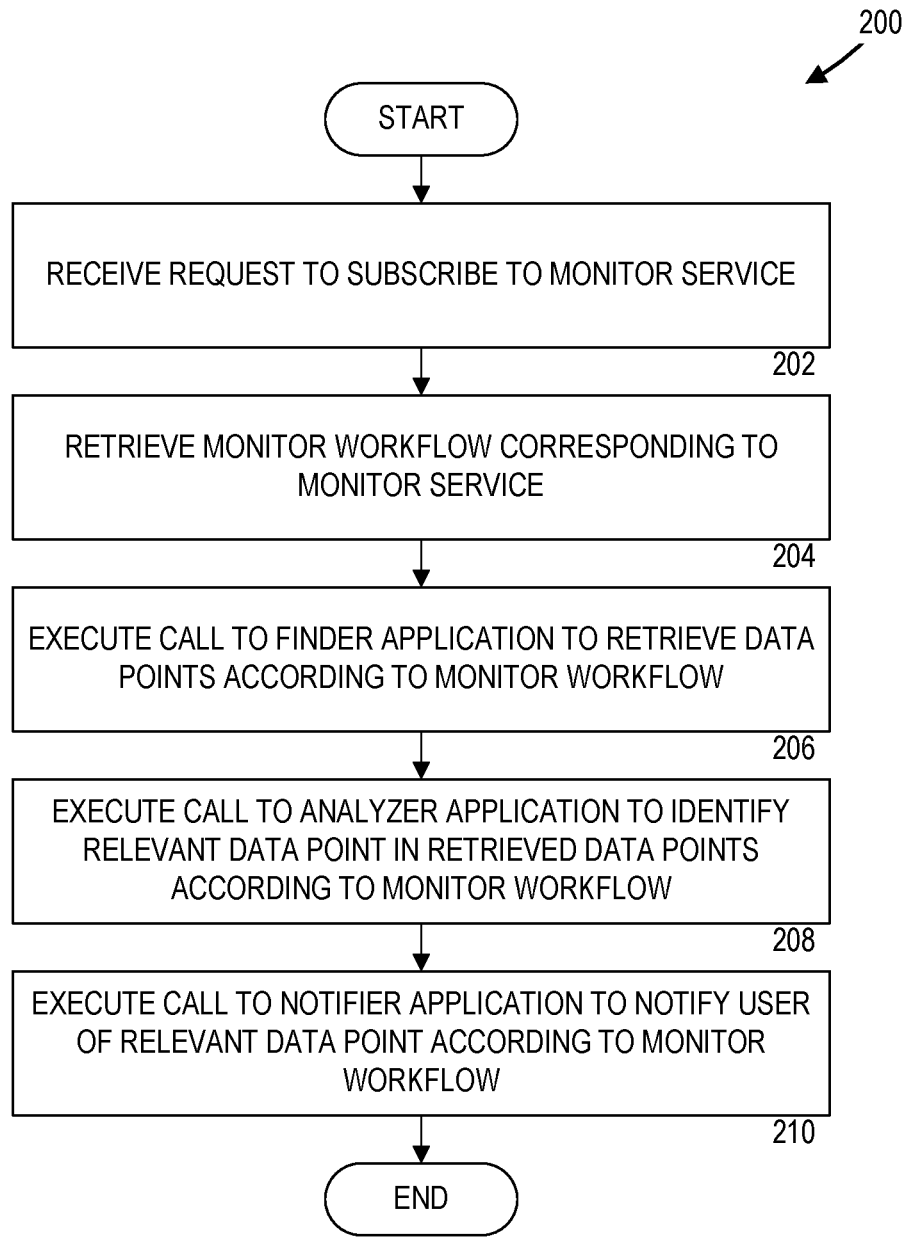
FIG. 2 is a flow diagram illustrating a method for providing a monitoring service in a cloud-based computing environment, in accordance with some embodiments.

Referring now to FIG. 2, additional details regarding the operation of the framework 100 will be provided. In particular, FIG. 2 is a flow diagram illustrating a method for providing monitoring services in a cloud-based computing environment, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where the controller application 104 may receive a request to subscribe to a monitoring service. The request may be received via any suitable entry point, such as web, voice, SMS, mobile applications, and the like. The request to subscribe to the monitoring service may include the subscription criteria 125, the workflow lifecycle configuration 126, and/or a notification configuration 128. For example, a user may access the façade 102, which may be configured as a website. Through the façade 102, the user may enter the subscription criteria 125, the workflow lifecycle configuration 126, and the notification configuration 128. The façade 102 may then provide the subscription criteria 125, the workflow lifecycle configuration 126, and the notification configuration 128 to the controller application 104. When the controller application 104 receives the request to subscribe to the monitoring service, the routine 200 may proceed to operation 204.

At operation 204, the controller application 104 may retrieve, from the database 114, a monitor workflow, such as the monitor workflows 116A, 116B, corresponding to the subscription criteria. For example, the controller application 104 may determine whether a monitor workflow exists that corresponds to the subscription criteria 125. If an existing monitor workflow corresponding to the subscription criteria 125 is available, then the controller application 104 may retrieve the existing monitor workflow from the database 114 by the GUID corresponding to the existing monitor workflow. If an existing monitor workflow corresponding to the subscription criteria 125 is not available, then the controller application 104 may instruct the monitor application 106 to generate a new monitor workflow corresponding to the subscription criteria 125. The monitor application 106 may then generate the new monitor workflow and store the new monitor workflow in the database 114. The monitor application 106 may also return the GUID corresponding to the new monitor workflow to the controller application 104 in response to the instruction. Upon receiving the GUID corresponding to the new monitor workflow from the monitor application 106, the controller application 104 may retrieve the new monitor workflow from the database 114. Upon retrieving either the existing monitor workflow or the new monitor workflow from the database 114, the controller application 104 may execute the monitor workflow.

The monitor workflow may define calls to the finder application 108, the analyzer application 110, and the notifier application 112. Operation 206 may correspond to a first call to the finder application 108. Operation 208 may correspond to a second call to the analyzer application 110. Operation 210 may correspond to a third call to the notifier application 112. The controller application 104 may perform these calls to the finder application 108, the analyzer application 110, and the notifier application 112 in accordance with the workflow lifecycle configuration 126. For example, when the monitor workflow expires according to the workflow lifecycle configuration 126, the controller application 104 may cease performing the calls defined in the monitor workflow, thereby terminating the subscribed monitoring service.

At operation 206, the controller application 104 may execute the first call to the finder application 108 according to the monitor workflow. When the controller application 104 executes the call to the finder application 108, the controller application 104 may provide the subscription criteria 125 to the finder application 108. The controller application 104 may execute the call to the finder application 108 on a predefined schedule or in predefined intervals.

By executing the call to the finder application 108, the controller application 104 may receive the data points 130 from the finder application 108. The data points 130 may correspond to the subscription criteria 125. The finder application 108 may be configured to retrieve the data points 130 from the content services 118. Upon retrieving the data points 130 from the content services 118, the finder application 108 may return the data points 130 to the controller application 104 in response to the first call. When the controller application 104 executes the first call to the finder application 108 and receives the data points 130, the routine 200 may proceed to operation 208.

At operation 208, the controller application 104 may execute the second call to the analyzer application 110 according to the monitor workflow. When the controller application 104 executes the call to the analyzer application 110, the controller application 104 may provide the data points 130 as retrieved by the finder application 108 to the analyzer application 110. By executing the call to the analyzer application 110, the controller application 104 may receive at least one relevant data point 130A in the data points 130 from the analyzer application 110. The analyzer application 110 may be configured to retrieve the context information 132 from the context services 120. The analyzer application 110 may then apply the context information 132 to the data points 130 in order to identify the relevant data point 130A. In particular, the context information 132 may provide contextual insight regarding the relevancy or importance of each of the data points 130. Upon identifying the relevant data point 130A in the data points 130, the analyzer application 110 may return the relevant data point 130A to the controller application 104 in response to the second call. When the analyzer application 110 executes the second call to the analyzer application 110 and receives the relevant data point 130A, the routine 200 may proceed to operation 210.

At operation 210, the controller application 104 may execute the third call to the notifier application 112 according to the monitor workflow. When the controller application 104 executes the call to the notifier application 112, the controller application 104 may provide the relevant data point 130A and the notification configuration 128 to the notifier application 112. The notifier application 112 may be configured to notify the user of the relevant data point 130A. In particular, the notifier application 112 may identify an appropriate communication service in the communication services 122 that is adapted to deliver notifications to the user by the notification method defined in the notification configuration 128. Upon identifying the appropriate communication service, the notifier application 112 may instruct the appropriate communication service to notify the user of the relevant data point 130A in accordance with the notification method defined by the notification configuration 128. When the controller application 104 executes the third call to the notifier application 112 and delivers the notification of the relevant data point 130A to the user, the routine 200 may repeat (e.g., periodically, continuously, or on demand as needed) or terminate.

Turning now to FIG. 3, an example computer architecture diagram showing a computer 300 is illustrated. The computer 300 may include a central processing unit 302, a system memory 304, and a system bus 306 that couples the memory 304 to the 302. The computer 300 may further include a mass storage device 312 for storing one or more program modules 314 and the database 114. Examples of the program modules 314 may include the controller application 104, the monitor application 106, the finder application 108, the analyzer application 110, and the notifier application 112. The database 114 may store the monitor workflows 116 and other relevant data. The mass storage device 312 may be connected to the processing unit 302 through a mass storage controller (not shown) connected to the bus 306. The mass storage device 312 and its associated computer-storage media may provide non-volatile storage for the computer 300. Although the description of computer-storage media contained herein refers to a mass storage device, such as a hard disk or CD-ROM drive, it should be appreciated by those skilled in the art that computer-storage media can be any available computer storage media that can be accessed by the computer 300.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network such as the network 318. The computer 300 may connect to the network 318 through a network interface unit 310 connected to the bus 306. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/output controller 308 may provide output to a display or other type of output device (not shown).

The bus 306 may enable the processing unit 302 to read code and/or data to/from the mass storage device 312 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 314 may include software instructions that, when loaded into the processing unit 302 and executed, cause the computer 300 to provide a monitoring service in a cloud-based computing environment. The program modules 314 may also provide various tools or techniques by which the computer 300 may participate within the overall systems or operating environments using the components, flows, and data structures discussed throughout this description. For example, the program modules 314 may implement interfaces for providing a monitoring service in a cloud-based computing environment.

In general, the program modules 314 may, when loaded into the processing unit 302 and executed, transform the processing unit 302 and the overall computer 300 from a general-purpose computing system into a special-purpose computing system customized to provide a monitoring service in a cloud-based computing environment. The processing unit 302 may be constructed from any number of transistors or other discrete circuit elements, which may individually or collectively assume any number of states. More specifically, the processing unit 302 may operate as a finite-state machine, in response to executable instructions contained within the program modules 314. These computer-executable instructions may transform the processing unit 302 by specifying how the processing unit 302 transitions between states, thereby transforming the transistors or other discrete hardware elements constituting the processing unit 302.

Encoding the program modules 314 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 314 may transform the physical state of the semiconductor memory, when the software is encoded therein. For example, the program modules 314 may transform the state of transistors, capacitors, or other discrete circuit elements constituting the semiconductor memory.

As another example, the computer-storage media may be implemented using magnetic or optical technology. In such implementations, the program modules 314 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing a monitoring service in a cloud-based computing environment are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method, implemented at a computing device that includes one or more hardware processors, for providing a monitoring service in a cloud-based computing environment, the method comprising computer-implemented operations for:
    retrieving a monitor workflow corresponding to the monitoring service;
    executing, at the one or more hardware processors, a first call to retrieve data points according to the monitor workflow;
    executing, at the one or more hardware processors, a second call to identify a plurality of relevant data points in the data points; and
    executing, at the one or more hardware processors, a third call to notify a user of the plurality of relevant data points.

2. The method of claim 1, further comprising receiving a request from a user to subscribe to the monitoring service, comprising:
    receiving subscription criteria from the user, the subscription criteria specifying relevant parameters related to the monitoring service;
    receiving a time limit to provide the monitoring service; and
    receiving a notification configuration from the user, the notification configuration specifying a notification method to be implemented by a notifier application.

3. The method of claim 2, wherein retrieving the monitor workflow corresponding to the monitoring service comprises:
    determining whether a database contains an existing monitor workflow corresponding to the subscription criteria;

in response to determining that the database contains the existing monitor workflow corresponding to the subscription criteria, retrieving the existing monitor workflow from the database; and in response to determining that the database does not contain the existing monitor workflow corresponding to the subscription criteria, generating a new monitor workflow corresponding to the subscription criteria.

4. The method of claim 2, wherein executing the first call to retrieve data points according to the monitor workflow comprises sending the subscription criteria to a finder application.

5. The method of claim 4, wherein the finder application is configured to (a) query one or more content services to retrieve the data points corresponding to the subscription criteria and (b) return the data points in response to the first call.

6. The method of claim 1, wherein executing the second call to identify the plurality of relevant data points in the data points comprises sending the data points to an analyzer application.

7. The method of claim 6, wherein the analyzer application is configured to (a) query one or more context services to retrieve context information providing contextual insight to the data points, (b) apply the context information to the data points to identify a relevant data point, and (c) return the relevant data point in response to the second call.

8. The method of claim 1, wherein executing the third call to notify the user of the relevant data point comprises sending the relevant data point and the notification configuration to a notifier application.

9. The method of claim 8, wherein the notifier application is configured to (a) identify a relevant notification service from a plurality of notification services, the relevant notification service configured to notify the user through the notification method, and (b) instruct the relevant notification service to notify the user of the relevant data point through the notification method.

10. The method of claim 1, further comprising terminating the monitoring service when the monitoring service expires.

11. The method of claim 1, further comprising receiving a request from a user to subscribe to the monitoring service from a façade.

12. The method of claim 1, wherein receiving the monitor workflow corresponding to the monitoring service comprises receiving the monitor workflow corresponding to the monitoring service from a monitoring application.

13. The method of claim 1, wherein the monitor workflow specifies web addresses for a finder application, an analyzer application, and a notifier application.

14. A hardware computer system, comprising:
a processor;
a memory communicatively coupled to the processor; and
a program module which executes in the processor from the memory and which, when executed by the processor, causes the computer system to provide a monitoring service in a cloud-based computing environment by
receiving a time limit to provide the monitoring service,
receiving a notification configuration, the notification configuration specifying a notification method to be implemented by a notifier application,
retrieving a monitor workflow corresponding to subscription criteria, the subscription criteria specifying relevant parameters related to the monitoring service, and executing a first call to a finder application to retrieve data points corresponding to the subscription criteria according to the monitor workflow.

15. The computer system of claim 14, wherein the program module further causes the computer system to provide the monitoring service in the cloud-based computing environment by executing a second call to an analyzer application to identify a relevant data point in the data points.

16. The computer system of claim 15, wherein the program module further causes the computer system to provide the monitoring service in the cloud-based computing environment by executing a third call to a notifier application to notify a user of the relevant data point through the notification method.

17. The computer system of claim 16, wherein executing a first call to a finder application to retrieve data points corresponding to the subscription criteria according to the monitor workflow comprises sending the subscription criteria to the finder application; and wherein the finder application is configured to (a) query one or more content services to retrieve the data points corresponding to the subscription criteria and (b) return the data points in response to the first call.

18. The computer system of claim 16, wherein executing a third call to a notifier application to notify the user of the relevant data point through the notification method comprises sending the relevant data point and the notification configuration to the notifier application; and
wherein the notifier application is configured to (a) identify a relevant notification service in a plurality of notification services, the relevant notification service configured to notify the user through the notification method, and (b) instruct the relevant notification service to notify a user of the relevant data point through the notification method.

19. A computer-readable hardware storage device having computer-executable instructions stored thereon which, when executed by a computer, cause the computer to:
receive a workflow lifecycle configuration, the workflow lifecycle configuration specifying a time limit to provide the monitoring service;
receive a notification configuration, the notification configuration specifying a notification method to be implemented by a notifier application;
determine whether a database contains an existing monitor workflow corresponding to subscription criteria, the subscription criteria specifying relevant parameters related to a monitoring service;
in response to determining that the database contains the existing monitor workflow corresponding to the subscription criteria, retrieve the existing monitor workflow as a monitor workflow from the database;
in response to determining that the database does not contain the existing monitor workflow corresponding to the subscription criteria, generate a new monitor workflow as the monitor workflow corresponding to the subscription criteria;
execute a first call to a finder application to retrieve data points corresponding to the subscription criteria according to the monitor workflow; and
execute a second call to an analyzer application to identify a plurality of relevant data point in the data points.

20. The computer-readable storage medium of claim 19, further comprising computer-executable instructions stored thereon which, when executed by the computer, cause the computer to provide the monitoring service by executing a third call to a notifier application to notify a user of the relevant data point through the notification method.

21. The computer system of claim 20, wherein computer-executable instructions to execute a first call to a finder application to retrieve data points corresponding to the subscription criteria according to the monitor workflow comprises computer-executable instructions to send the subscription criteria to the finder application; and
   wherein the finder application is configured to (a) query one or more content services to retrieve the data points corresponding to the subscription criteria and (b) return the data points in response to the first call.

* * * * *